United States Patent Office 3,089,864
Patented May 14, 1963

---

3,089,864
POLYURETHANE PRODUCT
Manfred Katz, Wilmington, Del., and Emerson L. Wittbecker, West Chester, Pa., assignors to E. I. du Pont de Nemours and Company, Wilmington, Del., a corporation of Delaware
No Drawing. Original application Sept. 1, 1954, Ser. No. 453,672, now Patent No. 2,973,333, dated Feb. 28, 1961. Divided and this application Apr. 25, 1960, Ser. No. 24,254
4 Claims. (Cl. 260—77.5)

This invention relates to a novel and useful process and product. More particularly it is concerned with a polyurethane polymer and shaped articles produced from it.

The commercial adaptation of the polyurethanes to the production of shaped articles such as fibers and films has lagged due to fabrication difficulties. The known high melting polyurethanes lack chemical stability at temperatures required for melt processing. They also lack requisite solubility for conventional solvent processing. Those polymers which have been found sufficiently stable for melt spinning (usually about 170° C.) and the like, possess melting points too low for satisfactory fibers due to the tendency of such fibers to fuse during ironing.

It is an object of the present invention to provide a soluble polyurethane having a relatively high melting point.

Another object is to provide a polyurethane which is readily fabricated into a fiber or film from its solution.

It is another object to provide a polyurethane with improved high temperature properties which is prepared by a low temperature polymerization method.

Another object is to provide a flexible and elastic fiber and film produced from soluble, high melting polyurethane.

Other objects will become apparent in the course of the following description and the appended claims.

In accordance with the present invention a novel and useful soluble polyurethane melting above 200° C. is produced by reacting the bischloroformate of a beta-substituted-1,3-propanediol selected from the group comprising 2,2-dimethyl-1,3-propanediol and 1,1-di(hydroxymethyl)cyclohexane with a carbocyclic, diprimary diamine containing no more than two discrete six-membered carbocyclic rings, the amine groups being positioned other than ortho to each other on the monocarbocyclic structure and para on each ring to the position of ring junction on the dicarbocyclic structure, the said two discrete six-membered carbocyclic rings, when detached from each other being linked through a neutral bivalent group of one to four atoms in length and whose radical weight does not exceed 65. By "... a neutral bivalent group ... whose radical weight does not exceed 65" as used herein is meant a straight or branched chain structure containing in the chain, atoms such as carbon, oxygen, sulfur and nitrogen which are non-reacting under the conditions of the polymerization. Alkylene,

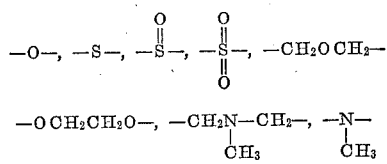

represent specific examples of such groups.

The following examples are cited to illustrate the invention. They are not intended to limit it in any manner. In these examples the inherent viscosity values of the product are given as an indication of the degree of polymerization obtained. In view of the relative ease with which these values are determined, they provide a useful method of evaluating the effect of process variables on a given type of polymerization. The values may be misleading when used to compare different types of polyurethanes, but in general, those having values of at least about 0.2 are suitable for spinning. In determining these values, viscosimeter flow times are obtained at 25.0°±0.1° C. for a solvent for the polyurethane and for a solution of the polyurethane in the solvent at a concentration of 0.5 gram per 100 cubic centimeters of solution. The inherent viscosity value is then calculated as 2 times the natural logarithm of the relative viscosity of the solution compared to that of the pure solvent. Unless otherwise stated, the solvent used in determining the inherent viscosities in the folowing examples is meta-cresol. The melting point is taken as the lowest temperature at which a fresh polymer sample leaves a wet molten trail as it is stroked with moderate pressure across a clean heated metal surface, such as a brass block. Bulk polymer is supported manually or with tweezers, and powder or the like is manipulated with a spatula.

Example I 415 parts of phosgene are condensed in 520 parts of dioxan in a vessel equipped with a Dry Ice condenser. A solution of 182 parts of 2,2-dimethyl propanediol in 365 parts of dioxan is formed by heating the components to 50° C. This latter solution is gradually added with stirring to the phosgene-dioxan solution, maintaining the temperature of the combined components at 0° C. After standing for 10 hours, the excess phosgene and the hydrogen chloride formed are removed by distillation under reduced pressure (approximately 5 mm. mercury). The residue is distilled at a pressure of from 0.5 to 1 mm. mercury. A 90% yield, based on the diol of 2,2-dimethyl propanediol bischloroformate boiling at 79° C. at 0.5 mm. mercury is obtained.

57.2 parts of the bischloroformate of 2,2-dimethyl-1,3-propanediol prepared as described above in 750 parts of chloroform are added to a rapidly stirred emulsion of 56.6 parts of 4,4'-isopropylidenedianiline, 58.3 parts of sodium carbonate, 1500 parts of of chloroform and 1,000 parts of water at room temperature. After 15 minutes the emulsion is broken by addition of n-hexane. The polymer precipitates. It is collected by filtration and washed with an aqueous solution of 1% hydrochloric acid to render unreacted amine water soluble. This is followed by a water wash until the collected polymer is acid free. The yield of polyurethane is quantitative, based on the amine. The polymer has an inherent viscosity of 1.21 and a polymer melt temperature of 315° C. It is soluble at room temperature in acetone, methyl ethyl ketone, methyl ethyl ketone/methanol (60/40), acetone/methanol (88/12), tetrahydrofuran and dimethylformamide.

Example II

An emulsion is prepared by adding 99.1 parts of 4,4'-methylene-dianiline in 880 parts of hot benzene to a rapidly stirred solution of 106 parts of sodium carbonate, 25 parts of sodium lauryl sulfate as a dispersing agent in 2,000 parts of water at room temperature. Thereafter 114.4 parts of the bischloroformate of 2,2-dimethyl-1,3-propanediol in 440 parts of benzene is added. The emulsion is broken with ethanol. The polymer precipitates. It is collected and washed with ethanol to remove monomeric contaminants and then with water. The yield is 82%. The polymer has an inherent viscosity of 2.16 and a polymer melt temperature of 305° C. It is soluble in acetone, methyl ethyl ketone, methyl ethyl ketone/methanol (60/40), acetone/methanol (88/12), tetrahydrofuran and dimethylformamide.

Example III

A solution of 28.6 parts of the bischloroformate of 2,2-dimethyl-1,3-propanediol in 300 parts of nitrobenzene is added to rapidly stirred emulsion containing 25.0 parts of 4,4'-oxydianiline, 29.15 parts of sodium carbonate, 1,200 parts of nitrobenzene and 500 parts of water at room temperature. The emulsion is broken by distilling off the organic solvent and the polymer is collected and washed as in Example II. A 100% yield of the polyurethane based on the diamine is obtained. It is soluble in acetone, methyl ethyl ketone, tetrahydrofuran, chloroform/methanol (88/12) and dimethylformamide. It has a polymer melt temperature of 250° C.

Example IV

A solution of 57.2 parts of the bischloroformate of 2,2-dimethyl-1,3-propanediol in 345 parts of methylene chloride is added to a rapidly stirred emulsion containing 53.1 parts of 2,2'-bi-p-toluidine, 58.3 parts of sodium carbonate, 10 parts of sodium lauryl sulfate as dispersing agent, 690 parts of methylene chloride and 1000 parts of water at room temperature. The emulsion is broken by distilling off the organic solvent and the polymer is collected and washed as in Example II. A 93% yield of polyurethane based on amine is obtained. It has a polymer melt temperature of 285° C. It is soluble in dimethylformamide and m-cresol.

Example V

A solution of 28.6 parts of the bischloroformate of 2,2-dimethyl-1,3-propanediol in 150 parts of nitrobenzene is added to a rapidly stirred emulsion containing 23 parts of benzidine, 58.3 parts of sodium carbonate, 5 parts of sodium lauryl sulfate as dispersing agent, 300 parts of nitrobenzene and 500 parts of water. After 15 minutes n-hexane is added to break the emulsion. The polymer is isolated and washed as in Example I. The product has a polymer melt temperature of 330° C. It is soluble in dimethylformamide.

Example VI

A solution of 28.6 parts of the bischloroformate of 2,2-dimethyl-1,3-propanediol in 300 parts of nitrobenzene is added to a rapidly stirred emulsion containing 31.6 parts of 3,3'-dichlorobenzidine, 58.3 parts of sodium carbonate, 600 parts of nitrobenzene and 500 parts of water at room temperature. The emulsion is broken and the polymer collected and washed as in Example I. The polyurethane thus produced has a polymer melt temperature of 230° C. It is soluble in dimethylformamide.

Example VII

A solution of 57.2 parts of the bischloroformate of 2,2-dimethyl-1,3-propanediol in 345 parts of methylene chloride is added to a rapidly stirred mixture of 66 parts of 3,3'-dimethoxybenzidine, 26.5 parts sodium carbonate, 10 parts of sodium lauryl sulfate as dispersing agent, 690 parts of methylene chloride and 1,000 parts of water at room temperature. After 15 minutes the emulsion is broken and the polymer collected and washed as in Example I. A 79% yield based on amine is obtained. The product has a polymer melt temperature of 218° C. and is soluble in dimethylformamide and pyrrole.

Example VIII

A solution of 57.2 parts of the bischloroformate of 2,2-dimethyl-1,3-propanediol in 345 parts of methylene chloride is added to a rapidly stirred mixture containing 50.3 parts of 3,3'-dimethylbenzidine, 58.3 parts of sodium carbonate, 10 parts of sodium lauryl sulfate as dispersing agent, 690 parts of methylene chloride and 1,000 parts of water at room temperature. After 15 minutes the emulsion is broken and the polymer collected and washed as in Example I. A yield of 98% polyurethane based on amine is obtained. It has a polymer melt temperature of 255° C. and is soluble in hot cyclohexane, dimethylformamide and pyrrole.

Example IX

A solution of 57.2 parts of the bischloroformate of 2,2-dimethyl-1,3-propanediol in 345 parts of methylene chloride is added to a rapidly stirred emulsion containing 27.0 parts of p-phenylenediamine, 58.3 parts sodium carbonate, 10 parts of sodium lauryl sulfate as dispersing agent, 690 parts of methylene chloride and 1,000 parts of water at room temperature. After 15 minutes the emulsion is broken and the polymer collected and washed as in Example I. A 73% yield of polyurethane based on amine is obtained. The polymer melt temperature is 276° C., the inherent viscosity is 1.16 and the polymer is soluble in dimethylformamide.

Example X

A solution of 114.5 parts of the bischloroformate of 2,2-dimethyl-1,3-propanediol in 375 parts of chloroform is added to a rapidly stirred emulsion containing 105.2 parts of 4,4'-methylenebis[cyclohexylamine] (high in trans isomers), 106 parts sodium carbonate, 20 parts of sodium lauryl sulfate as dispersing agent, 1,500 parts of chloroform and 2,000 parts of water in an ice cooled vessel. The solvent is boiled off and the polymer is isolated and washed with hot water. The yield is quantitative. The product has a polymer melt temperature of 225° C. It is soluble in chloroform/methanol (88/12), tetrafluoropropanol, dimethylformamide, pyrrole and chloroform.

Example XI

A solution of 57.2 parts of the bischloroformate of 2,2-dimethyl-1,3-propanediol in 690 parts of methylene chloride is added to a rapidly stirred mixture containing 14.3 parts of 1,4-diaminocyclohexane, 58.3 parts of sodium carbonate, 1,380 parts of methylene chloride and 1,000 parts of water at room temperature. The emulsion is broken and the polymer collected and washed as in Example I. The product is soluble in chloroform/methanol (88/12), dimethylformamide, pyrrole, acetic acid/water (95/5) and trichloroethane/formic acid mixtures.

Example XII 57.2 parts of the bischloroformate of 2,2-dimethyl-1,3-propanediol is added over a 40 second interval to an emulsion of 219 parts of benzene in 1650 parts of water containing in solution 53 parts of sodium carbonate as acid acceptor, 25 parts of sodium lauryl sulfate as dispersing agent and 35 parts of 2,4-toluenediamine at room temperature. After 10 minutes, the emulsion is broken by distilling off benzene under reduced pressure. 71 parts of the polymer is collected. It is washed with hot water and dried. It has a polymer melt temperature of 210° C., an inherent viscosity of 0.93 and is soluble in dimethylformamide and in a methanol/acetone solution (12/88).

Example XIII

The technique of Example XII is repeated substituting 30 parts of m-phenylenediamine for the 2,4-toluenediamine. A yield of 62 parts of product with a polymer melt temperature of 210° C. and an inherent viscosity of 0.85 is obtained. It is soluble in dimethylformamide and in methanol/acetone (12/88).

Example XIV

To a rapidly stirred mixture containing 28.5 parts of 1,3-diaminocyclohexane, 58.3 parts of sodium carbonate, 1,380 parts of methylene chloride and 1,000 parts of water at room temperature is added 57.2 parts of the bischloroformate of 2,2-dimethyl-1,3-propanediol. After 10 minutes the emulsion is broken and the polymer is collected and washed as described in Example I. A colorless polyurethane is obtained which melts above 200° C. is soluble in a mixture of 88 parts of chloroform and 12 parts methanol, in chloroform, in tetrahydrofuran, in dimethylformamide, in a mixture of 95 parts acetic acid and 5 parts water and in a mixture of 82 parts dioxan and 18 parts water.

*Example XV*

100 parts of phosgene are condensed in 250 parts of dioxan in a vessel equipped with a Dry Ice condenser. A solution of 72 parts of 1,1-dimethanolcyclohexane in 400 parts of dioxan is slowly added to the phosgene-dioxan solution, maintaining the reactants at 0° C. After standing 10 hours, excess phosgene and hydrogen chloride formed are removed under reduced pressure. The bischloroformate of 1,1-dimethanolcyclohexane formed has a boiling point of 110 to 113° C. at 5 mm. pressure.

A solution of 67.25 parts of the bischloroformate of 1,1-dimethanolcyclohexane prepared as described above in 220 parts of benzene is added to a stirred emulsion containing 49.55 parts of 4,4'-methylenedianiline, 12.5 parts of sod. lauryl sulfate as dispersing agent, 53 parts of sodium carbonate, 440 parts of benzene and 1,550 parts of water at room temperature. The emulsion is broken and the polymer is collected and washed as in Example II. The product has an inherent viscosity of 0.94 and a polymer melt temperature of 235° C. It is soluble in chloroform, chloroform/methanol (88/12), methyl ethyl ketone, cyclohexanone, dimethylformamide and chloroform/formic acid (85/15).

*Example XVI*

A solution of 45.6 parts of the bischloroformate of 2,2-dimethyl-1,3-propanediol in 175 parts of benzene is added rapidly to a stirred emulsion containing 45.2 parts of 3,3'-dimethyl-4,4-diamino, diphenylmethane, 697 parts of benzene and 1200 parts of water at room temperature. After completion of the reaction (15 minutes), the benzene is distilled off. The polymer precipitates. It is collected and washed with hot water. It has an inherent viscosity of 0.9, a polymer melt temperature of 225° C., and is soluble in dimethylformamide.

*Example XVII*

The polymer prepared as described in Example II is dissolved to produce a solution containing 18.5% solids in a methanol, acetone solvent (the proportion of methanol to acetone by weight being 12 to 88). The solution is extruded at about 52° C. under 140 pounds per square inch pressure through a 5-hole spinneret, each hole having a diameter of 0.1 mm. into a 108° C. air stream and the yarn is collected at a wind-up speed of 46 yards per minute. The dried yarn is drawn 6 times its extruded length over a 150° C. pin. It is highly crystalline, having a tenacity of 5.5 grams per denier, an elongation of 21%, an initial modulus of 47 grams per denier, a work recovery at 3% elongation of 89% and a tensile recovery at 5% elongation of 97%.

*Example XVIII*

The polymer prepared as described in Example II is dissolved in dimethyl formamide to produce a solution containing 20% solids. The solution is extruded through the spinneret described in Example XVII at 120° C. under 160 pounds per square inch pressure into a 190° C. air stream and the yarn is collected at a wind-up speed of 133 yards per minute. It is drawn 4½ times its extruded length over a 170° C. hot pin. It has a round cross section.

*Example XIX*

The polymer of Example II is dissolved in an ethanol/methylethylketone (20/80) mixture to produce a solution containing 25% solids. The solution is extruded through the spinneret described in Example XXVII at 50° C. under 150 pounds per square inch pressure into a 100° C. air stream and the yarn is collected at a wind-up speed of 56 yards per minute. It is drawn 3½ times its extruded length over a 150° C. hot pin. It has a peanut-shaped cross section.

*Example XX*

The polymer of Example I is dissolved in an ethanol/methylethylketone (20/80) mixture to produce solution containing 24% solids. The solution is extruded through the spinneret of Example XVII as 68° C. into a 100° C. air stream and is collected at a wind-up speed of 125 yards per minute. It is drawn 3.3 times over a 90° C. hot pin, is boiled off taut and then boiled off relaxed. It has a tenacity of 2.1 grams per denier, an elongation of 38% and an initial modulus of 35 grams per denier.

*Example XXI*

The solution of polymer prepared in Example XVII is cast upon a hot plate regulated at 110° C. Upon flashing off of solvent, a thin flexible film forms.

As previously defined the amine useful in producing the polyurethane of the present invention is a carbocyclic, diprimary diamine containing no more than two discrete six-membered carbocyclic rings, the amine groups being positioned other than ortho to each other on the monocarbocyclic structure and para on each ring to the position of ring junction on the dicarbocyclic structure, the said two discrete six-membered carbocyclic rings, when detached from each other, being linked through a neutral bivalent group of one to four atoms in length and whose radical weight does not exceed 65. Such a compound is a carbocyclic, diprimary diamine of the class

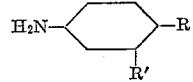

wherein R is a monovalent amino radical of the class of

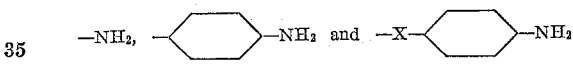

when R' is an inert monovalent radical, the hexagon representing a six-membered saturated or unsaturated ring, X representing an inert bivalent radical of one to four atoms in length and whose radical weight does not exceed 65, and R' is amino when R is an inert monovalent radical. By the expression " . . . inert monovalent radical . . . " is meant a radical of the class consisting of hydrogen, halogen, cyano, methyl and methoxy. Such a radical or radicals may be present as a substituent or substituents on either or both carbocyclic nuclei. Amond specific characteristic diamines within this definition may be mentioned m-phenylene diamine, 2,4-diamino toluene, 2,4-diamino anisole, p-phenylene diamine, benzidine, 4,4'-oxydianiline, 4,4'-methylenedianiline, α,α'-bi-p-toluidine, 4,4'-isopropylidenedianiline, 4,4'-trimethylenedianiline, 4,4'-ethylenedioxydianiline, 4,4'-sulfonyldianiline, 4,4'-thiodianiline, 4,4'-sulfinyldianiline, 1,4-cyclohexane diamine, [bicyclohexyl]-4,4'-diamine, 4,4'-oxybis[cyclohexylamine], 4,4'-methylenebis[cyclohexylamine], 4,4'-ethylenebis[cyclohexylamine], 4,4'-isopropylidenebis[cyclohexylamine], 4,4'-trimethylenebis[cyclohexylamine], 4,4'-ethylenedioxybis[cyclohexylamine], 4,4'-sulfonylbis-[cyclohexylamine], 4,4'-thiobis[cyclohexylamine], 4,4'-sulfinylbis[cyclohexylamine].

The preferred method for preparing the polyurethanes of the present invention, as illustrated above is by a polymerization in an emulsion wherein water constitutes the continuous phase while an inert water-immiscible liquid, which is a solvent for each polymeric reactant as well as a temporary solvent for the formed polymer, forms the dispersed phase. Benzene, nitrobenzene, methylene chloride and chloroform are typical inert, water-immiscible solvents satisfactory in the role of dispersed liquids. In general the water-immiscible phase will constitute from about 40% to about 60% of the dispersed reaction medium. A water-soluble acid acceptor is advantageous. Any water-soluble inorganic alkali more basic than the diamine, such as sodium hydroxide, sodium carbonate, sodium bicarbonate, borax or the like are suitable. An organic base, such as an excess of the diamine, a tertiary amine or the like may be used. While the use of a dispersing agent is not essential, it is useful in attaining a high degree of dispersion. The sodium lauryl sulfate employed in the examples is a typical material. It is convenient in combining reactants that one be dissolved in the organic phase of the aqueous dispersion to which is added the second reactant dissolved in more of the same organic solvent. This technique of combining reactants may be varied by using different solvents for each reactant, by adding each component separately to the dispersed reaction medium or the like. Usually the diamine and the bischloroformate are added in equimolar quantities. However, a slight excess of one or the other reactant is tolerable. The reaction usually progresses well at room temperature and reaches a satisfactory degree of polymerization in from less than 30 minutes. At times it is advisable to slow the reaction by using lower temperatures in the neighborhood of 0° C. The polymer may be precipitated by distilling off the organic phase of the reaction medium (preferably under reduced pressure), by addition of an organic solvent in which the polymer is not soluble (such as n-hexane or the like). The product may then be collected by filtration. It is washed to remove unreacted monomer with hot alcohol and water or with aqueous hydrochloric acid and water.

The resulting polyurethane may be represented as composed of recurring structural units of the general formula:

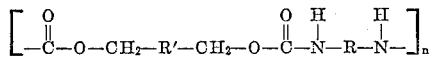

wherein $n$ is a large whole number, R' stands for the divalent residue

or

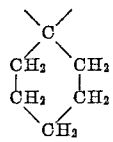

and R is the residue of the diprimary diamine as previously defined (i.e., the divalent radical formed by substituting one hydrogen of each amine group).

The solubility of the polyurethane of the present invention makes it possible to form it into shaped articles such as fibers and films from their solutions. Useful common solvents in this capacity include dimethylformamide; ketone/formic acid mixtures, such as acetone/formic acid, methyl ethyl ketone/formic acid; halogenated hydrocarbon/formic acid mixtures, such as chloroform/formic acid, 1,2,2-trichloroethane/formic acid; ketone/alcohol mixtures such as methanol/acetone, ethanol/acetone. Fibers and films may be formed by conventional wet and dry spinning and casting techniques as illustrated previously. The solutions are also useful in the application of coatings, for impregnating textile materials, paper and the like.

Many modifications will be apparent to those skilled in the art from a reading of the foregoing description without a departure from the inventive concept.

This application is a division of United States application Serial No. 453,672, filed September 1, 1954.

What is claimed is:
1. A polyurethane with a polymer melt temperature of at least about 200° C. containing recurring units of the formula:

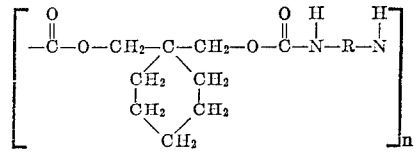

wherein $n$ is a large whole number and wherein R is a member of the group consisting of

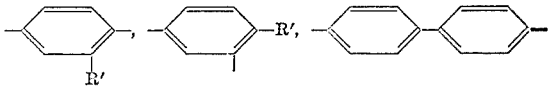

and

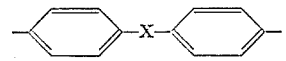

wherein R' is a member of the group consisting of hydrogen and methyl and wherein —X— is an inert bivalent radical of one to four atoms in length whose radical weight does not exceed 65 from the class consisting of alkylene,

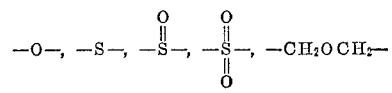

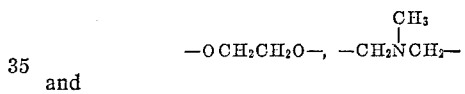

and

2. The polyurethane of claim 1 in the form of a fiber.
3. The polyurethane of claim 1 in the form of a film.
4. A polyurethane with a polymer melt temperature of at least about 200° C. containing recurring units of the formula:

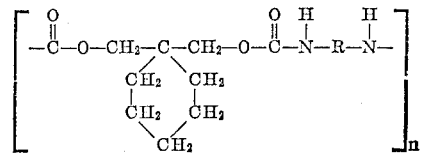

wherein $n$ is a large whole number and R is the residue of 4,4' methylenedianiline.

References Cited in the file of this patent
UNITED STATES PATENTS

| | | |
|---|---|---|
| 2,658,886 | Swerdloff et al. | Nov. 10, 1953 |
| 2,973,333 | Katz | Feb. 28, 1961 |

FOREIGN PATENTS

| | | |
|---|---|---|
| 904,471 | Germany | Feb. 18, 1954 |

OTHER REFERENCES

Whitmore et al.: J. Am. Chem. Soc., vol. 63, pages 124–127 (1941).